United States Patent [19]
Yoshizako et al.

[11] Patent Number: 5,975,281
[45] Date of Patent: Nov. 2, 1999

[54] BELT CLEANER AND ITS SCRAPER

[75] Inventors: Kageyoshi Yoshizako, Sakai; Yasuhiro Atari, Kawagoe, both of Japan

[73] Assignee: Nippon Tsusho Kabushiki Kaisha, Tokyo, Japan

[21] Appl. No.: 08/966,976

[22] Filed: Nov. 10, 1997

[30]     Foreign Application Priority Data

Jul. 18, 1997  [JP]  Japan .................................... 9-209649

[51] Int. Cl.⁶ ................................................ B65G 45/00
[52] U.S. Cl. ........................................... 198/499; 198/497
[58] Field of Search ..................... 198/497, 499

[56]         References Cited

U.S. PATENT DOCUMENTS

| | | |
|---|---|---|
| 3,841,470 | 10/1974 | Meguro . |
| 4,836,356 | 6/1989 | Mukai et al. ............................ 198/499 |
| 4,953,689 | 9/1990 | Peterson et al. ........................ 198/497 |
| 5,197,587 | 3/1993 | Malmberg ............................... 198/497 |
| 5,310,042 | 5/1994 | Veenhof ................................... 198/497 |
| 5,339,947 | 8/1994 | Campanile . | 
| 5,573,102 | 11/1996 | Punchalla ................................. 198/497 |

FOREIGN PATENT DOCUMENTS

| | | |
|---|---|---|
| 0 338 118 | 10/1989 | European Pat. Off. . |
| 338118 | 10/1989 | European Pat. Off. ............... 198/497 |
| 0 574 600 | 12/1993 | European Pat. Off. . |

*Primary Examiner*—William E. Terrell
*Assistant Examiner*—Khoi H. Tran
*Attorney, Agent, or Firm*—Sixbey, Friedman, Leedom & Ferguson; David S. Safran

[57]         ABSTRACT

A scraper constituting a blade which is yieldingly deformable in such a manner as to be curved from a linear state to an arch shape is held by a holding groove of a holder. The holding groove of the holder is formed by a substantially parallel rail like holding groove which is gradually apart from an axis extending to a transverse direction of the belt as the holding wall goes from both ends of the belt to a central portion thereof. The scraper comprises a leg portion inserted into the holding groove of the holder, an extended standing portion projecting from the holding groove so as to be in contact with the surface of the belt and a head portion formed by thickening a thickness of said extended standing portion more than a thickness of the leg portion toward a returning direction of the belt, in which a jaw portion projecting beyond a side surface of the leg portion is formed by a lower portion of said head portion. Accordingly, the jaw portion covers over a top end of one of the rail like holding walls of the holder in a state that the leg portion of the scraper is inserted into the holding groove of the holder.

4 Claims, 7 Drawing Sheets

BELT CLEANER AND ITS SCRAPER

FIELD OF THE INVENTION

The present invention relates to a belt cleaner having a scraper mounted thereon by which the leavings of conveying material, e.g. coke, stuck on the surface of a conveyor belt are removing during the return movement of the belt.

BACKGROUND OF THE INVENTION

A prior art cleaner for a conveyor belt is disclosed in U.S. Pat. No. 3,841,470 wherein the conveyor belt includes a plurality of cleaner means disposed thereon in the transverse direction of the conveyor belt at the return side of the same. Each cleaner means has a scraping portion thereof which intends to come into contact with the belt surface, while all of which are arranged in linear relationship. More specifically, a scraper having, at uppermost end, a scraping portion thereof comprising of tip members is yieldingly supported by a resilient member so that the scraping portion thereof becomes in contact with the belt surface under pressure by the resilience of the resilient member.

It is known that an endless conveyor belt, which is fitted for running in a circle between a drive pulley and an idler pulley, is supported on the forward side thereof by a plurality of guide rollers arranged at "trough" angles so as to be formed in a bow-like cross sectional shape in order to carry the transferring material in a stable manner. In other words, on the forward side of the running belt transferring the material thereon forward, the belt is supported so that the lengthwisely extending central region thereof can arcuately be deflected downward. The transferring materials are consecutively transferred generally on the central region of the belt, which will result in intensive wear on the central region of the belt surface rather than on both sides regions of the same.

Because of its tendency to deflection (termed generally as a "trough" tendency), the belt is deflected upward at a point midway between the side ends thereof thus to form an arch shape in cross section on the return side of the belt where the belt runs backward opposite to the forward direction thereof after discharging the transferring material therefrom. In such an arrangement of the known cleaner, the scraping portions of the cleaner means arranged in linear relationship are prevented from matching the belt surface when coming into close contact with the same. More specifically, there is a clearance between the scraping portions arranged linearly in said cleaner and the central region of the belt. The clearance becomes greater when the amount of wear on the central region of the belt surface is increased. Consequently, it will appear that the leavings of material on the central region of the belt surface cannot positively be scraped off by the scraping portions of the cleaner. Since the leavings of material adhered to the belt are substantially greater in amount at the lengthwisely extending central region of the belt surface than the side region of the same, some of the scraping portions disposed in the center get worn intensively in proportion to the amount of scraped material. This allows the clearance between the centrally mounted scraping portions and the belt surface to become greater gradually.

Each of the cleaner means has a scraper thereon which is supported yieldingly by the resilient member thus to be biased independently. When one of the scrapers is tilted laterally, a mass of the scraped material becomes trapped between the scraper and its adjacent scraper. This prevents the adjacent scraper from being biased independently, which will result in a stop of the returning movement of the scraping portion of the scraper from its biased position to its rest position for coming into contact with the belt surface.

Under the circumstances, an improved type of belt cleaner was developed by Nippon Tsusho Kabushiki Kaisha and is now sold under the product name "U-Type Cleaner" to which European Patent Nos. 0289659B1 and 0338118B1 (hereinafter referred to as the first EP and the second EP respectively) have granted.

In the cleaner for a conveyor belt according to the first EP, the scraper is adjustably supported for rotary displacement about the axis extending in the transverse direction of the belt and has the scraping portion thereon which intends to be in contact with the belt surface and is outwardly deflected a maximum from the common axis at a point midway between the side ends of the belt. Accordingly, when the scraper is turned upward about the axis to its standing position, the scraping portion thereof will arch its central region as lifted upward. This allows the scraping portion of the scraper to remain in close contact with the belt surface without clearance even if either the belt is trough-shaped in cross section or the lengthwisely extending central region of the belt surface gets worn, whereby the leavings on the belt surface will be scraped off in an optimum manner.

While according to the second EP, the scraper is formed of belt-like shape by a resilient board in which support members are embedded in a row, said resilient board comprises a cover wall extending integrally along over the aligned support members and covering the surfaces thereof, hinge portions connecting each two adjoined support members flexibly with each other so as to allow the scraper to be bent in a curved form thereby but not to allow the support members to separate with each other. The holder provides holding means which holds said scraper in its curved form via said hinge portions to deflect a maximum at a point midway between both ends of the belt from an axis extending transversely of the belt, the scraper is resiliently held by the holding means via said cover wall of the resilient board. The scraper is flexible to match the arcuate shape of the holding means in the holder. It is thus unnecessary for the scraper to have a shape corresponding to the arcuate shape of the holding means, which facilitates its fabrication.

However, according to the belt cleaner disclosed in the second EP, when the scraper scrapes the leavings of material on the conveyor belt, the leavings of material scraped and dropping down accumulate on the scraper and the holder. Then, since the deposit is plugged up in the holding means of the holder and solidified, the scraper and the holder are fixedly attached to each other. Accordingly, at a time of replacing the scraper which is consumed by using for a long time, it is hard to extract the scraper from the holder.

Further, according to the scraper of the second EP, the lower portion of the supporting member is held by the holding means of the holder, the upper portion thereof is stood up from the holding means and the scraping portion at the upper end thereof is come into contact with the running conveyor belt. Accordingly, a moment is produced on the supporting member toward a returning direction of the belt. The supporting member is fixedly attached to the yieldingly deformable resilient board and is opposed to the moment through the resilient board. However, since the resilient board may be compressed and deformed by the supporting member at that time, the supporting member is finally forced to become an inclined posture inclining toward the belt running direction from an erect posture. Accordingly, a biased abrasion is produced in the scraping portion. Further, since the conveyor belt does not generally run at a uniform manner but runs with vibrating at a wavy manner, compression of the resilient board are repeated. As a result, the supporting member vibrates between the erect posture and the inclined posture so that the biased abrasion in the scraping portion becomes remarkable.

Further, when the supporting member vibrates with repeating the compression of the resilient board as mentioned above, a tiredness of the resilient board is invited at an early time so that there is a risk that a crack is produced in the resilient board. Particularly, a crack is easily produced at the hinge portions formed between the adjacent supporting members which are independently vibrated to each other. When the hinge portions are separated by such a crack, a gap is produced between the scraping portions in the adjacent supporting members so that there is a risk that the scraped leavings of material is plugged up there.

SUMMARY OF THE INVENTION

An object of the present invention is to provide de a belt cleaner and its scraper which solve the above problems.

According to the invention, there is provided a belt cleaner for removing the leavings of material stuck on a surface of a conveyor belt during the returning movement of the belt, comprising a scraper disposed along a transverse direction of the belt and a holder for holding said scraper, in which said holder comprises holding groove constituted by substantially parallel rail like holding walls which are curved in such a manner as to be gradually apart from an axis A extending in the transverse direction of the belt as the holding walls go from both ends of the belt to a center thereof and said scraper comprises a yieldingly deformable blade so as to curve from a linear shape to an arch shape. Said scraper is inserted into and held by the holding groove of the holder and is held in a state of curving said scraper in the arch shape. Said blade like scraper comprises a leg portion inserted into the holding groove of the holder, an extended standing portion projecting from the holding groove so as to be in contact with the surface of the belt and a head portion formed by thickening a thickness of said extended standing portion more than a thickness of the leg portion toward a returning direction R of the belt, in which a jaw portion projecting beyond a side surface of the leg portion is formed by a lower portion of said head portion. Accordingly, said jaw portion becomes in contact with and covers over a top end of one of the rail like holding walls of the holder in a state that the scraper is inserted into and held by the holding groove of the holder.

According to another aspect of the invention, the scraper comprises a plurality of supporting members provided with scraping portions which may be in contact with the belt surface, a substantial band like resilient member for connecting the plurality of supporting members in a row and a rubber sheet attached along the plurality of supporting members near the scraping portion. Said resilient member comprises a leg portion inserted into the holding groove of the holder, an extended standing portion projecting from the holding groove so as to be in contact with the surface of the belt and a head portion formed by gradually thickening a thickness of said extended standing portion as it goes from an upper portion to a lower portion toward a returning direction R of the belt, in which a jaw portion projecting beyond a side surface of the leg portion is formed by a lower portion of said head portion, and a top end of one of the rail like holding walls is covered by said jaw portion. Said rubber sheet comprises a bonding portion formed by its upper edge portion and bonded to the supporting member at an opposite side of said head portion, and a skirt portion extending downward from said bonding portion, in which the skirt portion covers the other of the rail like holding walls of the holder.

Further, the belt cleaner of the invention has a pair of brackets for supporting an end of the support shaft projecting from both ends of the holder in such a manner as to freely rotate around an axis A, a tension means for driving said support shaft so as to rotate around the axis A, an actuating means for actuating said tension means and a restricting means for restricting a rotational range of said support shaft. Said tension means has an inner sleeve for detachably holding the support shaft, an outer sleeve disposed in an outer periphery of said inner sleeve through a gap, an elastic member disposed within said gap and connecting both sleeves and a tension lever outward extending from said outer sleeve. Said actuating means projects from the bracket and constitutes a controlling member movable forward and rearward which applies force to the tension lever so as to rotate said outer sleeve. Said controlling member applies a pressure to the elastic member so as to operate a torque to the inner sleeve by rotating the outer sleeve against the inner sleeve, thereby rotating the supporting shaft by the torque operated to said inner sleeve in a direction that the scraper is come into contact with the belt. Said restricting means comprises an extension sleeve extending from the inner sleeve of said tension means and integrally rotating together with the support shaft, a stopper lever extending to a radial direction of said extension sleeve and a fork means provided in said bracket, in which said stopper lever is freely fitted between a pair of pawl members provided in said fork means.

Still further, according to the invention, the scraper is manufactured by the steps comprising: a step of setting a substantial band like rubber sheet already vulcanized within a lower die of a mold; a step of, prior to setting in the lower die with a plurality of supporting members made of metal plate to which a hard tip is fixedly attached already, forming a tape like adhesive layer by applying an adhesive for rubber to each supporting member at an edge portion near a hard tip on one side surface opposing to the rubber sheet, however, by forming a non-bonding surface by not applying the adhesive for rubber to the remaining surface of said one side surface, and further forming an enlarged adhesive layer by applying the adhesive for rubber to all surface and its periphery of the other side surface of the supporting member; a step of setting said plurality of supporting members on the rubber sheet within said lower die in a parallel manner, disposing said tape like adhesive layer along the adjacent portion of the side edge of the rubber sheet and overlapping the non-bonding surface on the rubber sheet; a step of setting an upper die on said lower die with an unvulcanized rubber inserted therebetween and hot-pressing the upper and lower dies, whereby the adjacent portion of the side edge of the rubber sheet is bonded to said tape like adhesive layer, the substantial band like resilient member is formed within a cavity of the mold by vulcanizing the rubber inserted therein, the resilient member holding the plurality of supporting members with the enlarged adhesive layer being bonded, and integrally forming a leg portion substantially covering one side half portion of the plurality of supporting members, an extending portion substantially covering the other side half portion of the supporting member directing from said leg portion to the hard tip and a head portion projecting on said extending portion in a thickening manner; and a step of removing the upper and lower dies from each other and removing the formed resilient member including said supporting members from the mold.

BRIEF DESCRIPTION OF DRAWINGS

FIGS. 4a, 4b and 4c show an embodiment of a scraper used for a belt cleaner according to the invention, in which FIG. 4a is a perspective view which shows a state that a plurality of supporting members constituting a part of the scraper are disposed in parallel, FIG. 4b is a perspective view which shows a total structure of the scraper and FIG. 4c is a perspective view which shows a state that the scraper is curved;

FIGS. 5a and 5b show a function in a state of using a scraper, in which FIG. 5a is a cross sectional view which shows a function of an embodiment of a scraper according to the invention and FIG. 5b is a cross sectional view which shows a function of a scraper according to the conventional art;

FIGS. 6a and 6b show an embodiment of a method of manufacturing a scraper according to the invention, in which FIG. 6a is a cross sectional view which shows a state of removing a mold and FIG. 6b is a cross sectional view which shows a state of closing the mold and forming a resilient member; and FIGS. 7a and 7b show a function in a state of using a scraper, in which FIG. 7a is a cross sectional view which shows a function of a scraper according to another embodiment of the invention and FIG. 7b is a cross sectional view which shows a function of a scraper according to a comparative example.

DESCRIPTION OF PREFERRED EMBODIMENTS

Figure 1:
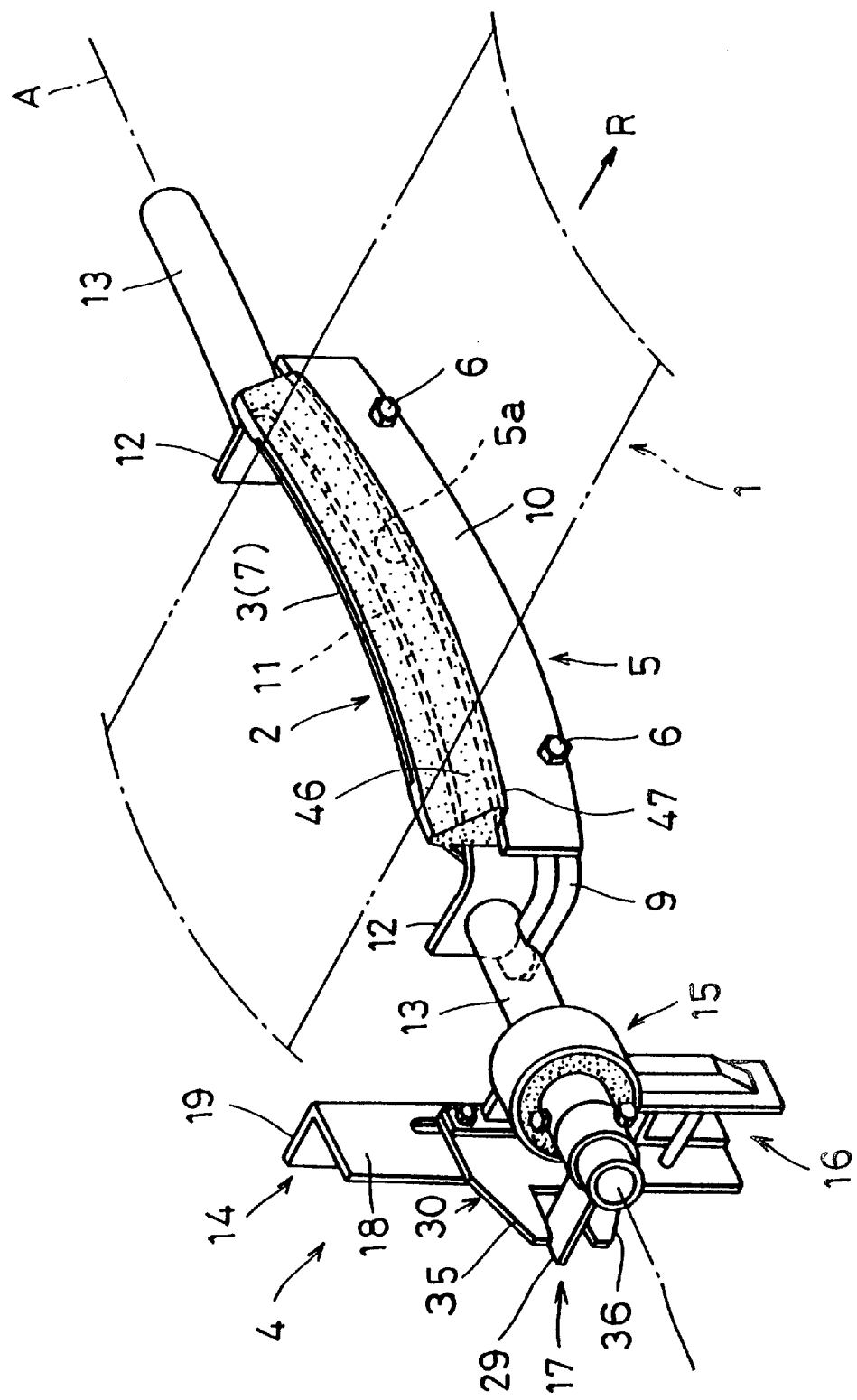
FIG. 1 is a perspective view which shows an embodiment of a belt cleaner according to the invention in an assembled state.
Figure 2:
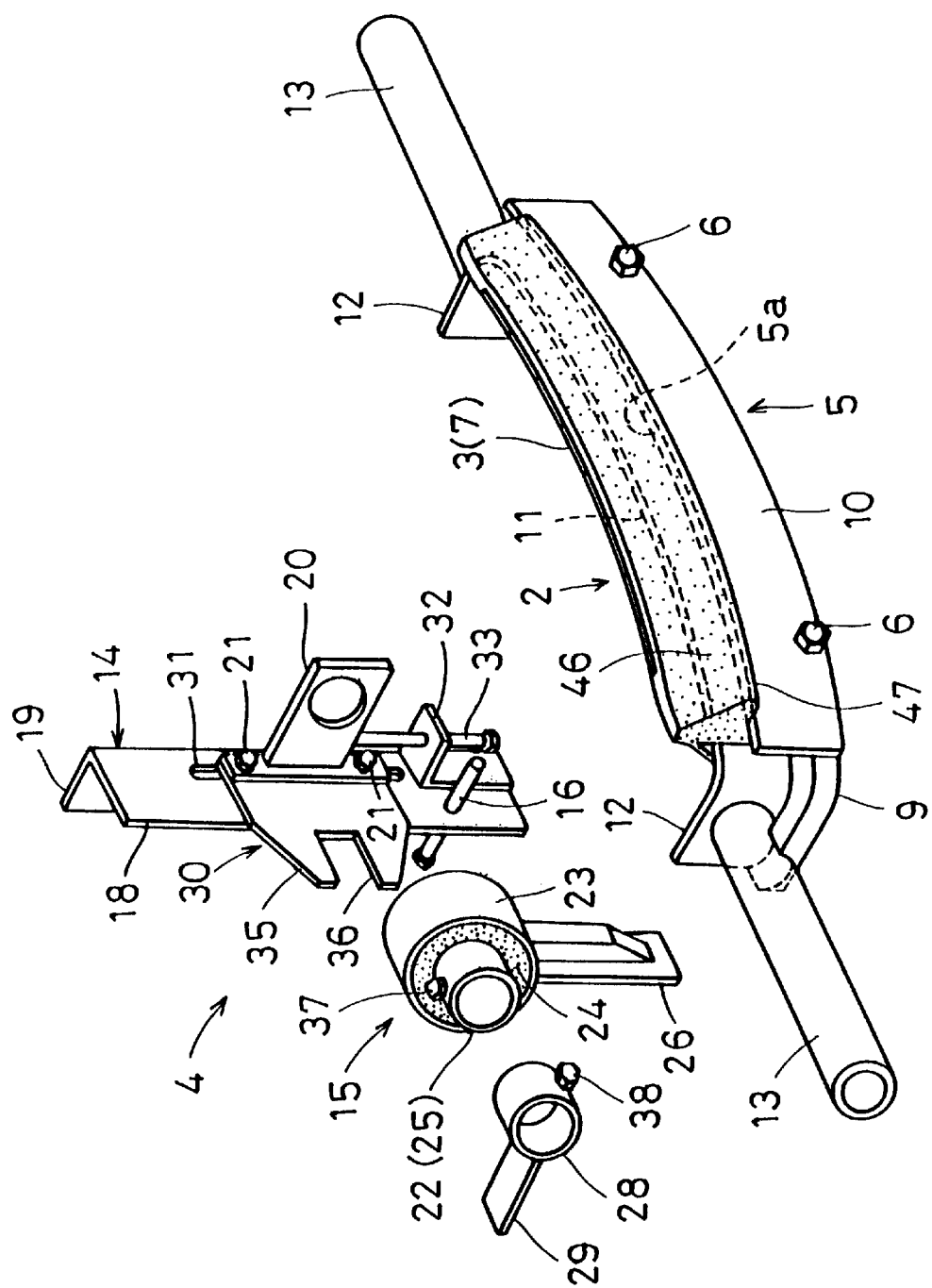
FIG. 2 is a perspective view which shows an embodiment of a belt cleaner according to the invention in an exploded state.

Preferred embodiments of the present invention will be described in detail in conjunction with the accompanying drawings.

In the embodiments described thereinafter, a belt cleaner according to the present invention is disposed in the transverse direction of and on the return side of a conveyor belt 1 and includes a scraper 2 for removing the leavings stuck on the surface of the belt. The scraper 2 is adjustably supported for rotary displacement about an axis A extending in the transverse direction of the belt and has a scraping portions 3 thereon which intends to be in contact with the surface of the belt and is outwardly deflected a maximum from the common axis A at a point midway between the side ends of the belt 1 so that the scraper 2 can be formed in a bow shape.

In the drawings, a length of the conveyor belt 1 on the return side is shown in particular. The side referred to as a "return side" is opposite to the forward side of a running belt on which the amount of material is transferred forward. After unloading the transferring material, the belt fitted between a drive pulley and an idler pulley to run in a circle makes a full turn at the terminal end thereof where one of the pulleys is mounted in position, and then will run backward opposite to the forward direction throughout the return section. Therefore, the return side includes a running passage on the pulley after the turning point.

Complete Arrangement of Belt Cleaner

A pair of supports 4 are fixedly disposed on both right and left sides of a belt 1 at the return side of the same. Since the supports 4 on their respective sides of the belt 1 are identical in construction and arranged in symmetrical relationship, one of the supports 4 is particularly shown in the drawings.

The scraper 2 is detachably supported by a holder 5 of bow-like shape deflecting in the return direction R of the belt 1 and secured with retaining means 6 such as set bolts. More particularly, the scraper 2 is formed in a curve to match the bow-shaped holder 5 and then, mounted to the holder 5. The scraper 2 has tips 7 of wear-resistant material such as carbide alloy or ceramic fixedly mounted on the back top thereof. The scraper 2 also has beneath the tips 7 a resilient sheet member 43 such as a rubber sheet fixedly mounted at top end to the back thereof. The sheet member 43 extends downward so as to cover the back of the scraper 2. The scraper 2 will further be described in detail later.

The holder 5 comprises an arcuate bottom member 9 and two rail-like holding walls 10 and 11 mounted in parallel arrangement to the bottom member 9 so as to form a holding means, more specifically a holding groove 5a. Both distal ends of the bottom member 9 and rear wall 11 form elongated portions 12, 12 extending in the counter-return running direction of the belt so that the elongated portions 12, 12 can be fixedly mounted to their respective support shafts 13, 13. The support shafts 13, 13 are coaxially disposed so that the scraper 2 can turn about the common axis A.

The holder 5 provided with the scraper 2 is arranged in place so that the belt 1 can run across the turning axis A while the support shafts 13, 13 are held by the supports 4, 4 respectively. When the scraper 2, which is shaped in such a manner that deflection from the axis A is a maximum at a point midway between the side ends of the belt 1, is turned upward by rotating the support shafts 13, 13 about the axis A from its rest position to its working position, the top ends of tips 7 on the scraper 2 will arch its central region in the shape of a bow thus to define a scraping section 3 of the same which is to be in contact with the concave surface of the belt 1.

The support 4 includes a bracket 14 supporting rotatably the support shaft 13, a tension means 15 of urging the support shaft 13 to be rotated, a means 16 of actuating the tension means 15, and a stopper means 17 of preventing the support shaft 13 from being rotated over the predetermined extent.

The bracket 14 is made of metal plate, being of L-shape in section, which is equipped with a supporting part 18 and a mount part 19. Under a state of disposing the mount part 19 of the bracket 14 to take a substantially vertical posture, it is mounted and fixed to a part of the belt conveyor (not shown) such as the frame, hopper and the like, using bolts and nuts.

A bearing member 20 for supporting rotatably the support shaft 13 is provided on and fixed to the supporting part 18, using the bolts 21 which pass through the supporting part 18 and screw into the bearing member 20.

The tension means 15 includes an inner sleeve 22, an outer sleeve 23 which is disposed concentrically to the inner sleeve 22 and giving a sufficient gap around the circumference of the inner sleeve 22, and an elastic member 24 such as rubber and the like which is interposed between the inner and outer sleeves 22 and 23. The inner sleeve 22 has an extension 25. A tension lever 26 is provided on and projected from the outer sleeve 23. In the drawings, the inner sleeve 22 and the outer sleeve 23 are made of metallic annular members which are concentric to each other. An elastic material, such as the rubber and the like, with which the gap between the sleeves 22 and 23 is filled, is vulcanized and molded together with a disposition of the sleeves 22 and 23 being sent in a mold so that the elastic member 24 is molded and adhered to the sleeves 22 and 23, resulting in a birth of a tension means 15. This tension means 15 locates the tension lever 26 to be directed radially of the outer sleeve 23.

The actuating means 16 includes a bolt which passes through one end of the supporting part 18 of the bracket 14 and is screwed therein in a movable manner. For this purpose, a nut 27 is fixed to the lower side face thereof by means of the welding and the like.

The stopper means 17 constitutes a restricting means for restricting a rotation range of the support shaft 13, and comprises an extension sleeve 28 neighboring the inner sleeve 22 of said tension means 15 and integrally rotating together with the support shaft 13, a stopper lever 29 extending in a radial direction of the extension sleeve 28 and a fork means provided in the supporting part 18 of the bracket 14. The fork means 30 is disposed between the bearing member 20 and the supporting part 18 and is fastened by the bolt 21.

The bolt 21 is inserted into a long hole 31 extending in a vertical direction of the supporting part 18, whereby a position of the bearing member 20 and the fork means 30 can be adjusted in the vertical direction with respect to the supporting part 18. Preferably, a substantially L-shaped supporting member 32 is fixed to the supporting part 18 below the bearing member 20, a pressing bolt 33 vertically extending through the supporting member 32 is screwed therein movable in both forward and rearward directions, and the end of bolt 33 is come into contact with the bearing member 20. Accordingly, a nut 34 is fixedly attached to the supporting member 32 by welding.

The fork means 30 has a pair of pawl members 35 and 36 extending substantially in parallel to an axis A and both of the pawl members 35 and 36 are disposed vertically with an interval.

An end of the support shaft 13 is removably inserted into and fixed to the inner sleeve 22 of the tension means 15. A set bolt 37 is provided in the extension portion 25 of the inner sleeve 22 for fixation. When the support shaft 13 is fixed to the tension means 15 by the set bolt 37, the tension lever 26 is disposed substantially in parallel to the supporting part 18 of the bracket 14 so as to oppose to the actuating means 16.

Further, the end of the support shaft 13 extending through the inner sleeve 22 is inserted into and fixed to the extension sleeve 28. A set bolt 38 is provided in the extension sleeve 28 for fixation. Thus, the stopper lever 29 is freely inserted between the pair of pawl members 35 and 36 of the fork means 30. A position of the stopper lever 29 along the peripheral direction of the extension sleeve 28 is adjusted by loosening the set bolt 38 and rotating the extension sleeve 28. The extension sleeve 28 may be integrally formed with the extension portion 25 of the inner sleeve 22.

Further to a state where the scraper 2 is in contact with the surface of the belt 1, screwing-in of the bolt constituting the actuating means 16 causes the end of the bolt to rotate the tension lever 26, whereby such a rotation is interlocked with the concurrent rotations of the tension means 15 and the support shaft 13, and the scraper 2 is pressed against the surface of the belt 1. Still further to the state of pressing thus the scraper 2 against the surface of the belt, continued screwing-in of the actuating means 16 forces the outer sleeve 23 to be rotated relatively to the inner sleeve 22 which forms a twisting deformation of the elastic member 24. As a result, the elastic force of rotating the scraper 2 in a standing-up direction functions on the inner sleeve 22 through the elastic member 24.

Accordingly, an operating of the conveyor under such circumstances allows the elastic force from the elastic member 24 to the scraper 2, whereby the scraper 2 is properly pressed against the surface of the belt 1, and the residual material can be well scraped off from the surface of the belt 1.

When the scraper 2 becomes worn, the restoring force of the twisted elastic member 24 causes the inner sleeve 22 to be rotated, the support shaft 13 being concurrently rotated in the same direction, and the scraper 2 is maintained to be pressed against the surface of the belt 1, so the scraping effect of the scraper 2 is still under way.

As the scraper 2 is worn out in the above manner, the elastic member 24 rotates the support shaft 13, so that the scraper 2 is always come into contact with the belt surface. However, when the tip 7 of the scraper 2 is completely worn out, the scraper can not suitably scrape the leavings of material on the belt surface. Accordingly, it is structured such that when the support shaft 13 rotates until the tip is completely worn out, the stopper lever 29 is brought into contact with the lower pawl member 36 of the fork means 30 so as to prevent the support shaft 13 from further rotating.

Figure 3:
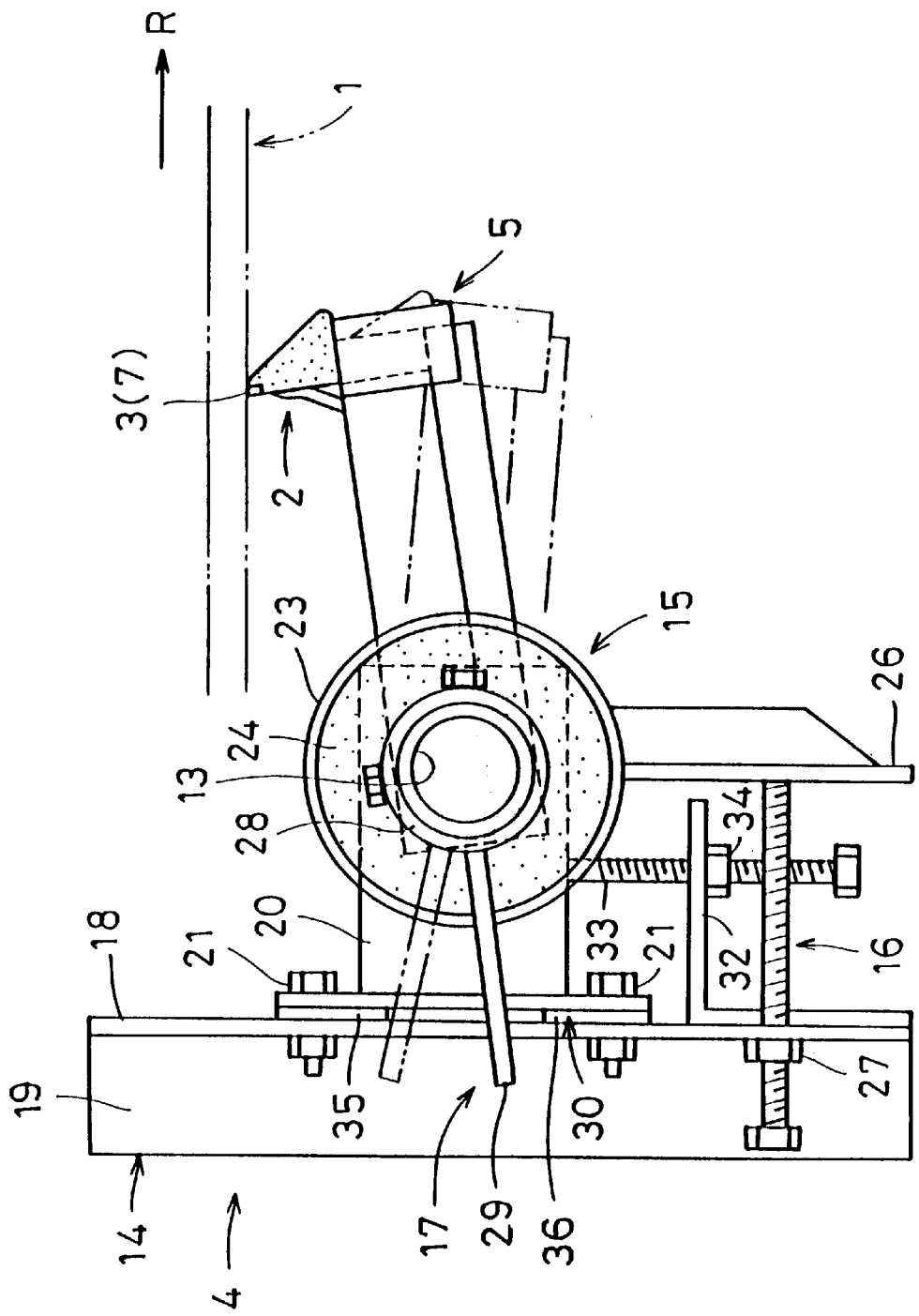
FIG. 3 is a side elevational view which shows an embodiment of a belt cleaner according to the invention.
Figure 4A:
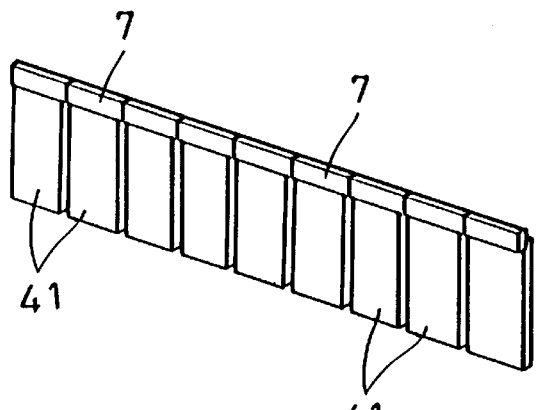
Figure 4B:
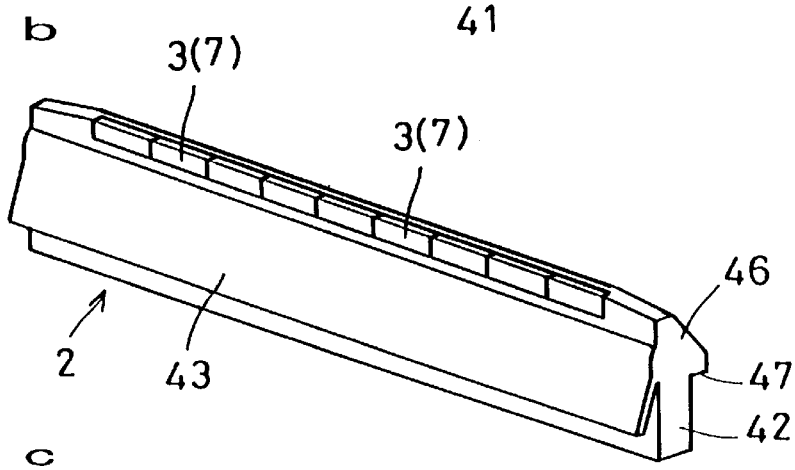
Figure 4C:
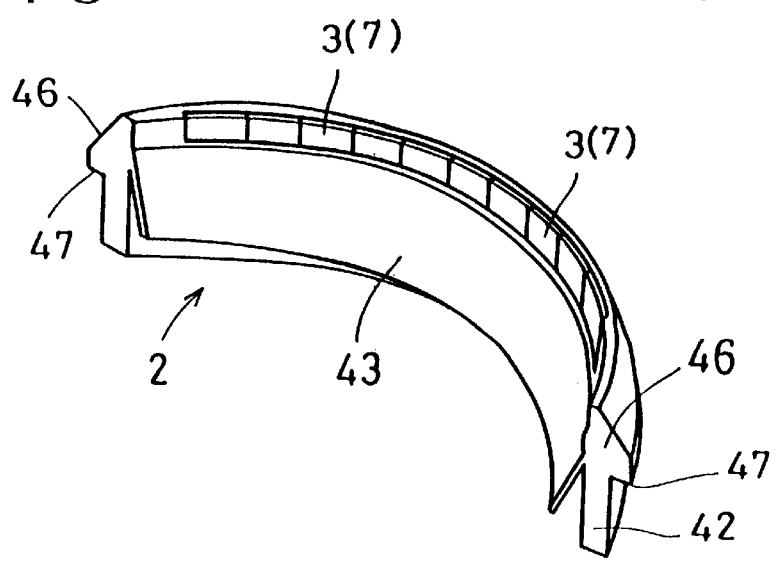

Incidentally, when the tip 7 is completely worn out, it is necessary to replace the scraper 2. Replacement of the scraper 2 is performed by rotating the bolt constituting the actuating means 16 so as to screw rearward. Accordingly, the elastic member 24 which was twisted and deformed is restored to its original state, thereby keeping the scraper 2 away from the belt surface, and as shown in a dotted line of FIG. 3, the holder 5 rotates around the axis A together with the scraper 2 by its own weight so as to descend. At that time, the stopper lever 29 is brought into contact with the upper pawl member 35 of the fork means 30 so as to hold the scraper 2 and the holder 5 in a state of the inclined posture directing downward. Accordingly, in a state of being held in the inclined posture directing downward, the scraper 2 already used can be removed from the holder 5 and the new scraper 2 can be attached to the holder 5.

Structure of Scraper

The scraper 2 comprises a plurality of supporting members 41 made of metal board formed by fixedly attaching the tip 7 constituting the scraping portion 3 on the upper end by brazing, a substantial band like resilient member 42 for connecting the plurality of supporting members 41 in a parallel state and a rubber sheet 43 bonded along the plurality of supporting members 41 near the scraping portion 3. In the illustrated embodiment, the tip 7 is formed in such a manner as to have a length slightly larger than the width of the supporting member 41 so as to project from both sides of the supporting member 41, the plurality of supporting members 41 are aligned with aligning the tips 7 on the same line, and in this state the supporting members 41 are buried in the resilient member 42 made of natural rubber or synthetic rubber. Accordingly, the resilient member 42 forms a hinge portion (not shown) by filling the rubber in the gap between the adjacent supporting members 41 and 41, thereby resiliently deforming the blade like scraper 2 through the hinge portion so as to curve from the linear state to the arch shape. In the case of illustrated example, the resilient member 42 is mainly provided in a front side (a side surface directing the returning direction R of the belt) of the supporting member 41 and is hardly provided in a back side (a side surface opposite the returning direction R of the belt) of the supporting member 41.

The resilient member 42 comprises a leg portion 44 to be inserted into the holding groove 5a of the holder 5, an extended standing portion 45 projecting from the holding groove 5a so as to be in contact with the surface of the belt 1 and a head portion 46 formed by gradually thickening a thickness of said extended standing portion 45 as it goes from an upper portion to a lower portion toward a returning direction R of the belt 1, in which a jaw portion 47 projecting beyond a side surface of the leg portion 44 is formed by a lower portion of said head portion 46.

Figure 6A:
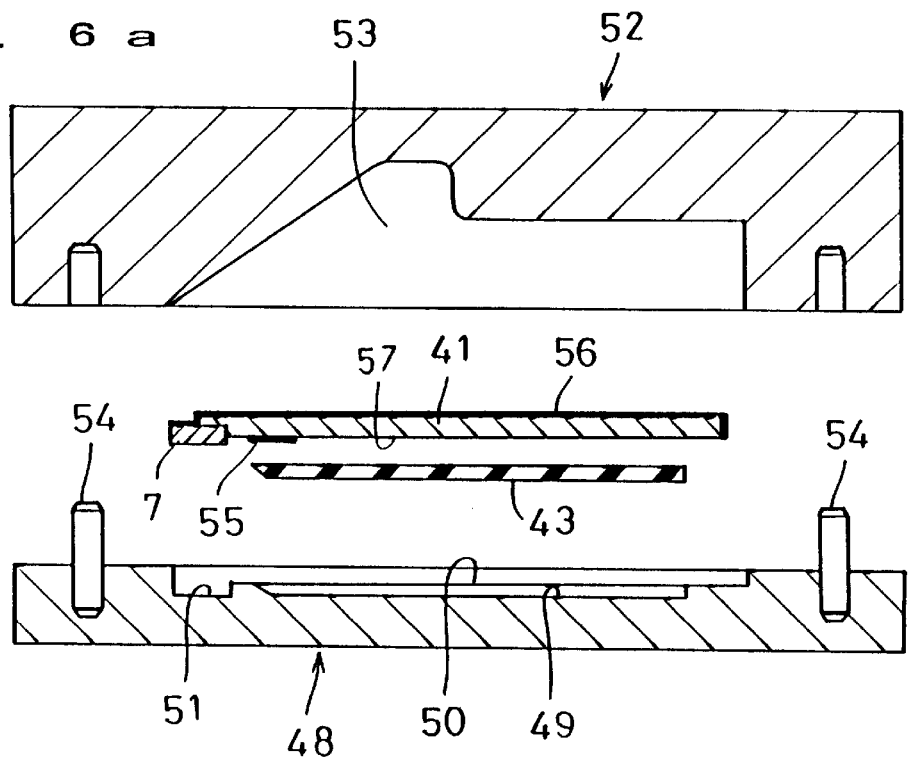
Figure 6B:
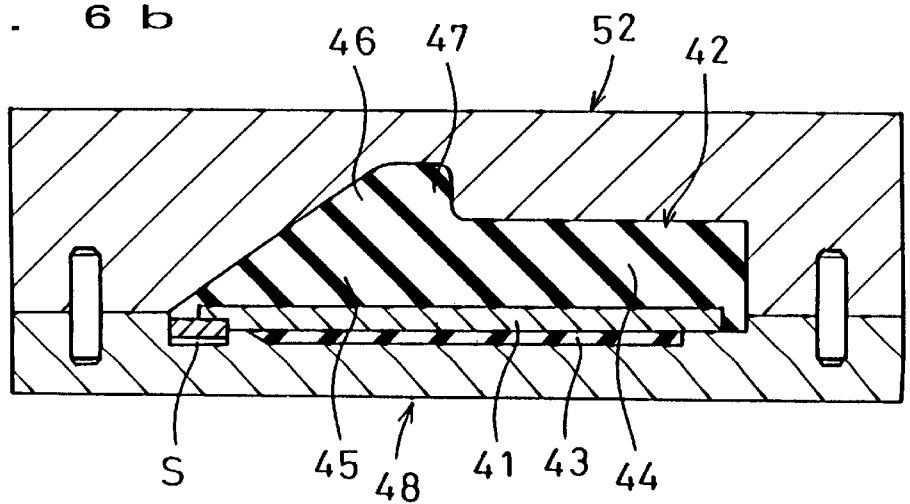

The scraper 2 is manufactured by using the mold as shown in FIG. 6.

A sheet recess portion 49 for fitting the rubber sheet 43 and a board recess portion 50 for fitting the supporting member 41 are formed in a lower die 48 of the mold, and a deep recess portion 51 for fitting the tip 7 is formed in the side end of the board recess portion 50. On the contrary, a cavity 53 for forming the extended standing portion 45, the head portion 46 and the leg portion 44 of the resilient member 42 mentioned above is formed in an upper die 52 of the mold. In this case, the lower die 48 and the upper die 52 is positioned by a pin 54 at a time of overlapping them.

Prior to molding, the rubber sheet 43 is prepared as a band like rubber sheet previously vulcanized. Further, the supporting member 41 is fixedly attached to the tip 7 previously by brazing, and comprises a tape like adhesive layer 55 and an enlarged adhesive layer 56 by applying the rubber adhesive to the supporting member 41. Accordingly, the adhesive layer 55 extending in a tape shape to a widthwise direction of the supporting member 41 is formed in a surface facing to the lower die 48 among both front and tail side surfaces of the supporting member 41 by applying the rubber adhesive to the portion adjacent to the tip 7, and a non-bonding surface 57 to which the rubber adhesive is not applied is formed in the remaining surface thereof. Still further, the enlarged adhesive layer 56 is formed in all of the surfaces facing to the upper die 52 and the periphery thereof among both the front and tail side surfaces of the supporting member 41 by applying the rubber adhesive in an expanded manner.

Then, in a state of opening the mold, at first, the rubber sheet 43 is fitted into the sheet recess portion 49 in the lower die 48, next the supporting member 41 is fitted into the board like recess portion 50 so as to dispose the tape like adhesive layer 55 along the adjacent portion of the side edge of the rubber sheet 43, and the non-bonding surface 57 is overlapped on the rubber sheet 43. In this manner, the plurality of supporting members 41 are provided in the board like recess portion 50 in a parallel manner. At this time, the tip 7 of each of the supporting members 41 is fitted into the deep recess portion 51 and a gap S is formed between the deep recess portion 51 and the tip 7.

Thereafter, the upper die 52 is positioned on the lower die 48 with a non-vulcanized rubber inserted in the cavity 53, and both the dies 48 and 52 are set in the hot press apparatus in a state of being positioned by the pin 54 so as to be hot pressed. Accordingly, the resilient member 42 made of rubber is vulcanized within the cavity 53 of the upper die 52, and the supporting member 41 is buried into the resilient member 42 so as to be bonded through the enlarged adhesive layer 56. At this time, the resilient member 42 is formed as a substantial band like member holding the plurality of supporting members 41 and is integrally molded to have the leg portion 44 covering substantial one half portion of the plurality of supporting members 41, the extending portion 45 covering substantial the other half portion of the supporting members 41 directing toward the tip 7 from the leg portion 44, the head portion 46 projecting in a thickening manner on the extending portion 45 and the jaw portion 47 forming the step portion between the head portion 46 and the leg portion 44. Further, the rubber sheet 43 is bonded to the supporting member 41 through the tape like adhesive layer 55, but is not bonded to the non-bonding surface 57 of the supporting member 41. Incidentally, since the gap S is formed between the tip 7 of the supporting member 41 and the deep recess portion 51, the heat between the lower die 48 and the tip 7 is thermally insulated, thereby preventing the tip 7 made of a cemented carbide from breaking due to a thermal impact.

When the hot pressing is completed, the upper and lower dies 52 and 48 are removed and the resilient member 42 molded with including the supporting member 41 is taken out from the mold.

Function of Scraper

As mentioned above, the scraper 2 can be yieldingly deformed in such a manner as to be curved from the linear state to the arch shape and is inserted along the arch-curved holding groove 5a of the holder 5. Accordingly, the scraper 2 is fixed by the retaining means 6 after the leg portion 44 of the resilient member 42 including the supporting members 41 is inserted into the holding groove 5a. In this state, the jaw portion 47 of the resilient member 42 comes in contact with and covers the top end of one of the rail like holding wall 10 and the rubber sheet 43 covers the other of the rail like holding wall 11. The rubber sheet 43 forms the skirt portion 43a extending downward from the bonding portion 43a bonded to the supporting member 41, and the skirt portion 43a covers over the outer side of the rail like holding wall 11.

Figure 5A:
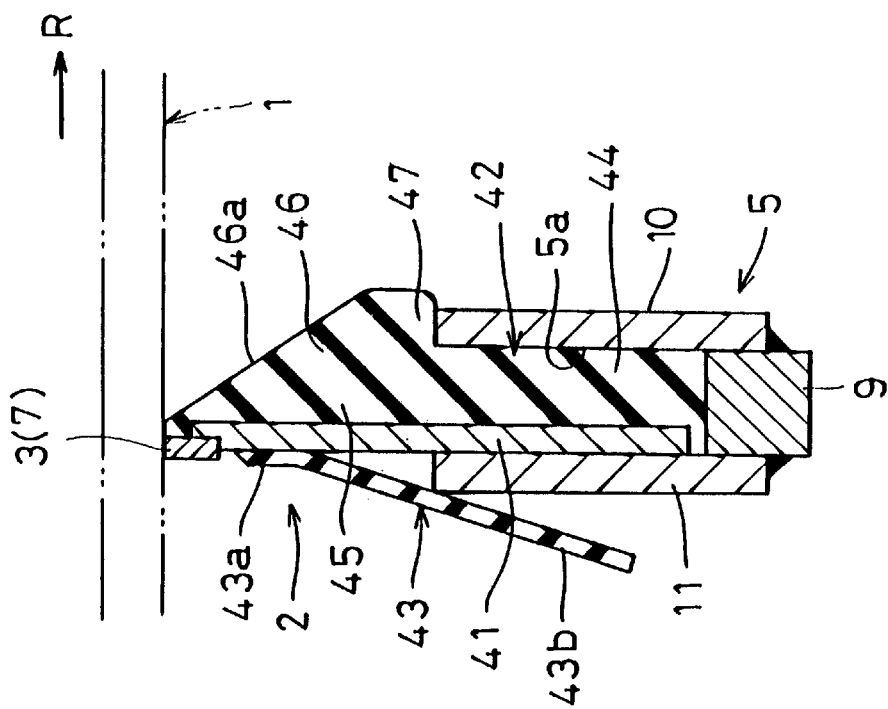

As mentioned above, when the scraping portion 3 of the scraper 2 is come into contact with the surface of the conveyor belt 1, thereby scraping the leavings of material on the belt surface, a moment is produced toward the returning direction R of the belt on the supporting member 41. The supporting member 41 is opposed to the moment through the yieldingly deformable resilient member 42, however, is going to be inclined toward the returning direction of the belt from the erect posture due to the compressed deformation of the resilient member 42. Accordingly, in the case of the above described second EP, as shown in the dotted line of FIG. 5b, the supporting member 41P is forced to take the inclined posture, so that the biased abrasion is produced in the scraping portion 3P. On the contrary, according to the scraper 2 of the invention, as shown in FIG. 5a, since the head portion 46 of the resilient member 42 supports the jaw portion 47 to one of the rail like holding wall 10 in a contact manner and the jaw portion 47 supports the head portion 46 in such a manner as to oppose to the moment, the supporting member 41 is hardly inclined so that the biased abrasion of the scraping portion 3 can be prevented.

Figure 5B:
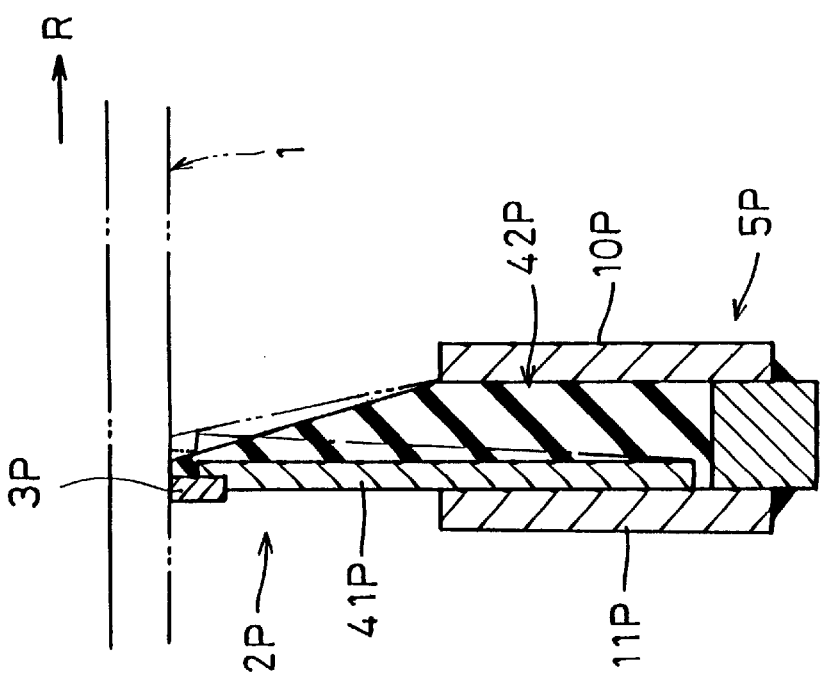

Further, in the case of the scraper of the second EP as shown in FIG. 5b, when the conveyor belt P does not run in a uniform manner, rather runs with vibrating in a wavy manner, the supporting member 41P is vibrated with repeating compression of the resilient board 42P so that the deterioration or the tiredness of the resilient board 42P is easily invited at an early time. Further, there is a risk that the crack is produced at the hinge portion formed between the adjacent supporting members 41P independently vibrating to each other, thereby separating the hinge portion. In comparison with this, according to the scraper 2 of the invention, since the jaw portion 47 of the resilient member 42 is supported by the top portion of the holding wall 10 in a contact manner as mentioned above, thereby preventing the supporting member 41 from vibrating, production of such a crack can be prevented.

Further, as shown in FIG. 5b, in the case of the scraper according to the second EP, the leavings of material scraped by the scraper drop so as to be accumulated on the scraper 2P and the holder 5P. When such a deposit is plugged up in the holding groove of the holder 5P so as to be solidified, the scraper 2P and the holder 5P are firmly fixed to each other, so that it becomes difficult to replace the consumed scraper 2P. In comparison with this, according to the scraper 2 of the invention, since the deposit scraped off and dropped from the surface of the belt 1 is guided downward along the rubber sheet 43 at the portion of the scraping portion 3, while the deposit scraped off at the opposite side is dropped and guided downward along the head portion 46 toward the outer side of the holding groove 5a, the scraped and dropped material is not accumulated. Particularly, the conveyor belt 1 is often rotated inversely, in this case, the leavings of material on the belt surface drop mostly toward the head portion 46. In such a case, since the dropping material is dropped and guided along the inclined surface 46a of the head portion 46 so as to be dropped toward the outer portion of the holding wall 10 from the jaw portion 47, the dropping material is not plugged up in the holding groove 5a. As a result of this, it is easy to remove the consumed scraper 2 from the holder 5 so as to replace.

Another Embodiment of Scraper

Figure 7A:
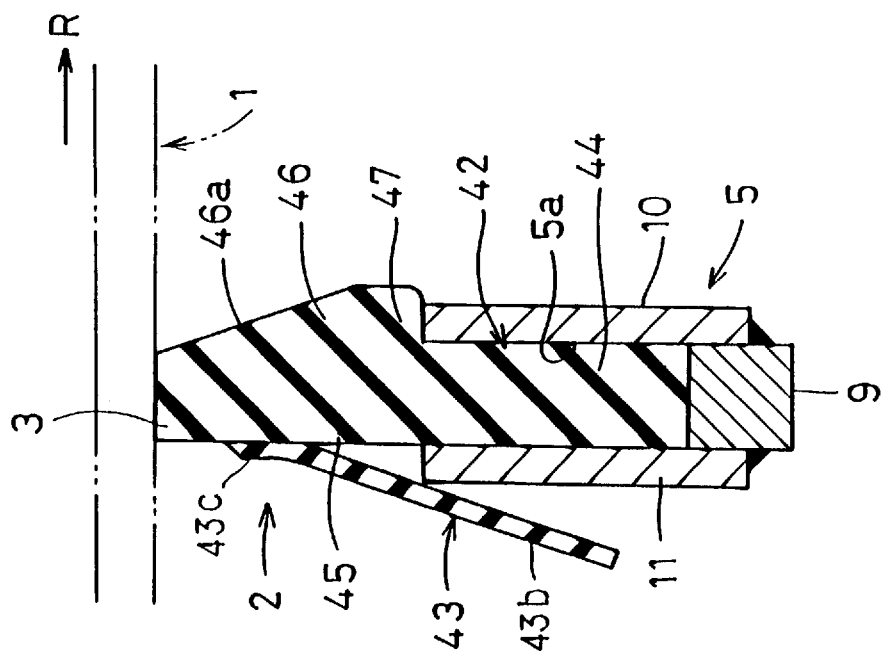
Figure 7B:
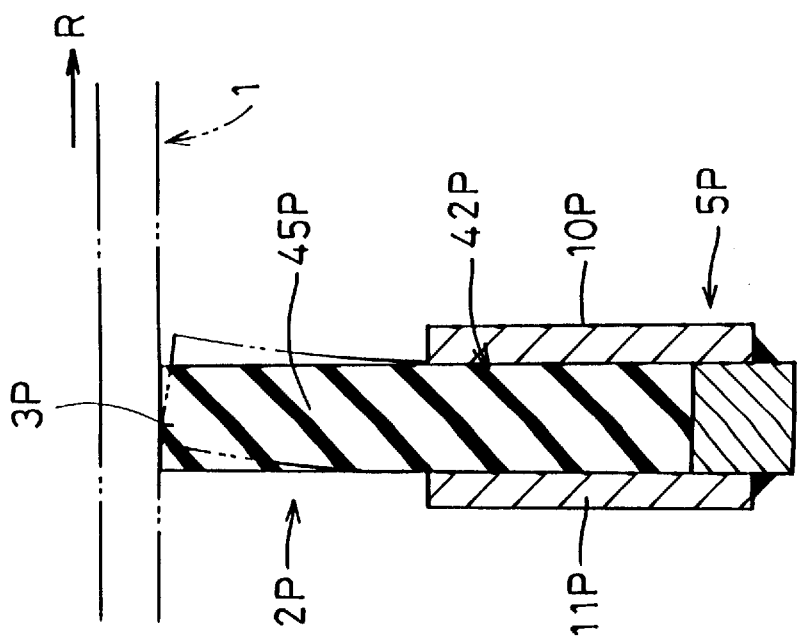

FIG. 7a shows another embodiment of the scraper according to the invention and FIG. 7b shows a comparison example against this embodiment. In this embodiment, the scraper 2 is constituted by the resilient member 42 formed by a rubber such as a urethane rubber and has the scraping portion 3 on the top portion thereof. Accordingly, the resilient member 42 comprises the blade which is yieldingly deformable so as to be curved from the linear state to the arch shape, and is not provided with the supporting member made of metal board mentioned above. Then, the rubber sheet 43 is provided in the back portion of the resilient member 42.

The resilient member 42 comprises the leg portion 44 to be inserted into the holding groove 5a of the holder 5, the extended standing portion 45 projecting from the holding groove 5a so as to be in contact with the surface of the belt 1 and the head portion 46 formed by thickening a thickness of said extended standing portion 45 more than a thickness of the leg portion 44 toward the returning direction R of the belt 1, in which the jaw portion 47 projecting beyond the side surface of the leg portion 44 is formed by the lower portion of said head portion 46, so that the jaw portion 47 comes in contact with and covers over the top end of one of the rail like holding walls 10 of the holder 5. In this case, the rubber sheet 43 has the skirt portion 43b extending downward from the attaching portion 43c fixedly attached to the back portion of the extended standing portion 45 and covers over the outer portion of the rail like holding wall 11 by the skirt portion 43b.

When the scraping portion 3 of the scraper 2 is come into contact with the surface of the conveyor belt 1 so as to scrape the leavings of material on the belt surface, a moment is produced toward the returning direction R of the belt on the extended standing portion 45 of the resilient member 42. At that time, in the case of the comparison example as shown in FIG. 7b, the extended standing portion 45P is forced to take the inclined posture, thereby producing the biased abrasion on the scraping portion 3P. In comparison with this, according to the scraper 2 of the invention, as shown in FIG. 7a, since the head portion 46 of the extended standing portion 45 supports the jaw portion 47 to the top portion of one of the rail like holding wall 10 in a contact manner, and the jaw portion 47 supports the head portion 46 and the extended standing portion 45 in such a manner as to oppose to the moment, the inclination of the extended standing portion 45 can be prevented and the biased abrasion of the scraping portion 3 can be prevented.

Further, in the case of the comparison example as shown in FIG. 7b, when the leavings of material scraped by the scraper drop down so as to be accumulated on the scraper 2P and the holder 5P and is plugged up in the holding groove of the holder 5P so as to be solidified, the scraper 2P and the holder 5P are firmly fixed to each other, thereby making it difficult to replace the consumed scraper 2P. In comparison with this, according to the scraper 2 of the invention, since the deposit scraped off and dropped from the surface of the belt 1 is guided toward the outer side of the holding wall 11 along the rubber sheet 43 at the back surface side of the resilient member 42, while the deposit scraped off at the opposite portion is dropped and guided toward the outer side of the holding wall 10 from the jaw portion 47, the dropping material is not plugged up in the holding groove 5a. As a result of this, it becomes easy to remove the consumed scraper 2 from the holder 5 so as to replace.

Effect of the Invention

According to the present invention, since the resilient member 42 constituting the scraper 2 which is yieldingly deformable so as to be curved from the linear state to the arch shape forms the head portion 46 having the jaw portion 47 in the extended standing portion 45 projecting from the holding groove 5a of the holder 5 and the jaw portion 47 covers the top end of one of the rail like holding wall 10 of the holder 5, the jaw portion 47 supported on the top end of the holding wall 10 in a contact manner suitably supports the extended standing portion 45 against the moment produced toward the returning direction R of the conveyor belt 1, thereby preventing the extended standing portion 45 from shifting to the inclined posture. Accordingly, the extended standing portion 45 can be always held in the erect posture so that the biased abrasion of the scraping portion 3 can be prevented.

Further, since the deposit scraped and dropped at a time when the belt 1 is inversely rotated is guided so as to be dropped toward the outer side of the rail like holding wall 10 from the jaw portion 47 along the head portion 46 of the resilient member 42, the deposit is not plugged up in the holding groove 5a. Accordingly, the jaw portion 47 has a guiding function for the dropping material and a sealing function for the holding groove 5a. Therefore, the consumed scraper 2 can be easily removed from the holder 5 and can be easily replaced.

What is claimed is:

1. A belt cleaner for removing the leavings of material stuck on a surface of a conveyor belt during the returning movement of the belt, comprising:

a scraper disposed along a transverse direction of the belt and a holder for holding said scraper;

said holder comprising a holding groove constituted by substantially parallel rail like holding walls which are curved in such a manner as to gradually depart from the transverse direction of the belt as the holding walls go from both ends of the belt to a center thereof, said scraper comprising a blade having an extended standing portion, a scraping portion at a free end of said standing portion and a leg portion below said standing portion, said blade being yieldingly deformable so as to curve from a linear shape to an arch shape and said scraper being inserted into and held by the holding groove of the holder so as to hold said scraper curved in the arch shape and said scraping portion in contact with the belt surface for scraping off the leavings of material thereon, while causing on the scraper a moment toward a returning direction of the belt, wherein:

said leg portion is inserted into the holding groove of the holder with the extended standing portion projecting from the holding groove and with the standing portion being provided with a head portion formed by gradually thickening said extended standing portion in a direction away from said free end and toward the returning direction of the belt, said head portion being provided with a jaw portion that projects beyond a side surface of the leg portion so that said jaw portion covers over one of the rail like holding walls of the holder, and said jaw portion having a height and thickness sufficient to form a means for supporting the head portion, including the extended standing portion, in such a manner as to oppose to said moment, whereby an inclination of the extended standing portion and a biased abrasion of the scraping portion may be prevented.

2. A belt cleaner according to claim 1, wherein said scraping portion comprises a plurality of supporting members provided with scraping parts which are in contact with the belt surface and which are connected in a row by said blade, and a rubber sheet, said rubber sheet having an upper edge portion bonded along the plurality of supporting members near the scraping parts at an opposite side of the head portion from said jaw portion and having a skirt portion covering the other of the holding rails from that covered by jaw portion.

3. A belt cleaner for removing the leavings of material stuck on a surface of a conveyor belt during the returning movement of the belt, comprising:

a scraper disposed along a transverse direction of the belt, a holder for holding said scraper, and a support shaft which projects from each end of the holder and defines an axis of rotation extending in said transverse direction;

said holder comprising a holding groove constituted by substantially parallel rail like holding walls which are curved in such a manner as to gradually depart from said axis of rotation as the holding walls go from both ends of the belt to a center thereof, said scraper comprising a blade which is yieldingly deformable so as to curve from a linear shape to an arch shape and said scraper being inserted into and held by the holding groove of the holder so as to hold said scraper curved in the arch shape;

said belt cleaner having a pair of brackets, each of which supports an end of a respective support shaft projecting from said holder in such a manner as to enable the holder to freely rotate around said axis, a tension means for driving said support shaft so as to rotate around said axis, an actuating means for actuating said tension means and a restricting means for restricting a rotational range of said support shaft, said tension means having an inner sleeve for detachably holding the support shaft, an outer sleeve disposed in an outer periphery of said inner sleeve through a gap, an elastic member disposed within said gap and connecting both sleeve, and a tension lever extending outward from said outer sleeve, said actuating means projecting from the bracket and constituting a controlling member which is movable forward and rearward and which applies force to the tension lever so as to rotate said outer sleeve, said controlling member applying a pressure to the elastic member so as to apply a torque to the inner sleeve by rotating the outer sleeve against the inner sleeve, thereby rotating the support shaft by the torque applied to said inner sleeve in a direction that the scraper is come into contact with the belt, wherein:

said blade like scraper comprises a leg portion inserted into the holding groove of the holder, an extended standing portion projecting from the holding groove so as to be in contact with the surface of the belt and a head portion formed by gradually thickening a thickness of said extended standing portion as it goes from an-upper portion to a lower portion toward a returning direction of the belt, in which a jaw portion projecting beyond a side surface of the leg portion is formed by a lower portion of said head portion, so that said jaw portion covers over a top end of one of the rail like holding walls of the holder, and wherein:

said restricting means comprises an extension sleeve extending from the inner sleeve of said tension means and integrally rotating together with the support shaft, a stopper lever extending in a radial direction of said extension sleeve and a fork means provided in said bracket, in which said stopper lever is freely fitted between a pair of pawl members provided in said fork means.

4. A scraper for a belt cleaner, wherein the scraper is yieldingly deformable so as to be curved from a linear state to an arch shape and comprises a resilient member formed in a substantially band like shape of vulcanized rubber; wherein said resilient member comprises a leg portion, an extended standing portion extending upward from said leg portion and a head portion formed by thickening said extended standing portion to a thickness greater than a thickness of the leg portion at at least one side surface of said extended standing portion, and a jaw portion projecting beyond a side surface of the leg portion, said jaw portion being formed by a lower portion of said head portion; wherein the scraper has a blade which is yieldingly deformable so as to be curved from the linear state to the arch shape which comprises a plurality of supporting members having a scraping portion at a top thereof, the plurality of supporting members being connected in a line by said resilient member and a rubber sheet bonded near the scraping portion along the plurality of supporting members; and wherein said rubber sheet comprises a bonding portion bonded to the supporting member with one side edge portion of said sheet positioned an opposite side of said head portion from said jaw portion, and a skirt portion extending downward from said bonding portion.

* * * * *